United States Patent [19]

Topcik

[11] Patent Number: 4,734,440

[45] Date of Patent: Mar. 29, 1988

[54] FOAMABLE COMPOSITIONS

[75] Inventor: Barry Topcik, Bridgewater, N.J.

[73] Assignee: Union Carbide Corporation, Danbury, Conn.

[21] Appl. No.: 943,076

[22] Filed: Dec. 18, 1986

Related U.S. Application Data

[63] Continuation-in-part of Ser. No. 889,246, Jul. 25, 1986, abandoned, which is a continuation-in-part of Ser. No. 806,157, Dec. 12, 1985, Pat. No. 4,659,746, which is a continuation-in-part of Ser. No. 684,687, Dec. 21, 1984.

[30] Foreign Application Priority Data

Dec. 20, 1985 [CA] Canada ..................... 498268
Aug. 14, 1986 [EP] European Pat. Off. ........ 86900518.1

[51] Int. Cl.$^4$ ................................. C08J 9/10
[52] U.S. Cl. ......................... 521/95; 521/93; 521/96; 521/140; 521/154
[58] Field of Search ............. 521/96, 95, 154, 140, 521/93

[56] References Cited

U.S. PATENT DOCUMENTS

| | | | |
|---|---|---|---|
| 4,160,072 | 7/1979 | Shinkai et al. | 521/154 |
| 4,252,906 | 2/1981 | Hosokawa et al. | 521/154 |
| 4,333,898 | 6/1982 | Schmidtchen | 521/79 |
| 4,413,066 | 11/1983 | Isaka et al. | 521/149 |
| 4,456,704 | 6/1984 | Fukumura et al. | 521/79 |

FOREIGN PATENT DOCUMENTS

| | | | |
|---|---|---|---|
| 1286460 | 8/1972 | United Kingdom | 521/154 |
| 1408154 | 10/1975 | United Kingdom | 521/154 |
| 1541271 | 2/1979 | United Kingdom | 521/154 |
| 1575961 | 10/1980 | United Kingdom | 521/154 |

Primary Examiner—Morton Foelak
Attorney, Agent, or Firm—Saul R. Bresch

[57] ABSTRACT

A foamable composition comprising a polymer selected from the group consisting of a hydrolyzable ethylene/silane copolymer and a hydrolyzable ethylene/ethyl acrylate/silane terpolymer and the following components in about the following amounts per 100 parts by weight of polymer:

| Component | Parts by Weight |
|---|---|
| azodicarbonamide | 1 to 25 |
| p,p'oxybis-benzene sulfonyl hydrazide | 0.5 to 3.5 |
| silanol condensation catalyst | 0.02 to 0.3 |

6 Claims, No Drawings

FOAMABLE COMPOSITIONS

This patent application is a continuation-in-part of patent application Ser. No. 889,246 filed on July 25, 1986, now abandoned, which is a continuation-in-part of patent application Ser. No. 806,157 filed on Dec. 12, 1985, now U.S. Pat. No. 4,659,746, which is a continuation-in-part of patent application Ser. No. 684,687 filed on Dec. 21, 1984.

SUMMARY OF THE INVENTION

This invention relates to compositions, which are adapted for the production of foamed articles characterized by having a smooth outer skin and fine cells.

BACKGROUND OF THE INVENTION

As a general rule, foams are produced by an extrusion operation in which a foamable composition is extruded into a shaped article and the shaped article allowed to expand and foam, or by a compression molding operation. Producing a foam by a compression molding operation is a relatively simple operation which involves, initially, placing a preform of a foamable composition, having a volume equal to about 103 percent of the volume of the mold cavity to provide a seal around the cavity, into the cavity of the mold, placing the filled mold in a hydraulic press and continuing according to the procedures described below.

Procedure I: The temperature of the hydraulic press is maintained at high levels, generally in excess of about 160° C. and the residence time in the press is such as to achieve substantially full activation of the peroxide and the gas generating compound. The hydraulic press is then opened, allowing the composition to expand and foam.

Procedure II: The temperature of the hydraulic press and residence time in the mold is maintained at a level such that the composition is partially cured. The partially cured composition, is preferably cooled, removed from the compression mold, placed in a hot oven and allowed to expand and foam.

Extruding foamable compositions into shaped articles and allowing the shaped articles to expand and foam involves a different set of conditions than those set forth in Procedures I and II. In the production of foams by the "extrusion" technique, the rate of cross-linking of the polymer and the rate of decomposition of the gas generating compound must be carefully balanced. If the rate of crosslinking is too rapid, expansion of the foamable composition will be unduly restricted. On the other hand, if the rate at which the gas generating compound decomposes substantially exceeds the rate at which crosslinking occurs, the evolved gases will escape and little, if any, expansion of the composition will take place.

DETAILED DESCRIPTION OF THE INVENTION

The present invention provides for foams having improved cell structures, that is, relatively small, uniform cells and relatively smooth outer surfaces by either the compression molding operation or by the extrusion technique. Foams of improved quality are produced, according to the present invention, by utilizing, in the foamable compositions a hydrolyzable ethylene/silane copolymer or a hydrolyzable ethylene/ethyl acrylate/silane terpolymer, azodicarbonamide, p,p'-oxybis-benzene sulfonyl hydrazide, and a silanol condensation catalyst. Preferably, the composition also includes an organic peroxide. The composition containing the organic peroxide optionally contains a monomeric acrylate ester of a polyhydric compound, which enhances the function of the peroxide.

The copolymer of ethylene and silane can be prepared by the process described in U.S. Pat. No. 3,225,018. The terpolymer of ethylene, ethyl acrylate, and silane can be prepared by the processes described in U.S. Pat. Nos. 4,291,136 or 4,328,323. The silane is present in the copolymer in the range of about 0.5 to about 10 percent by weight based on the weight of the copolymer and in the terpolymer in the range of about 0.5 to about 3 percent by weight based on the weight of the terpolymer and in both the copolymer and terpolymer is preferably in the range of about 0.5 to about 2 percent by weight. The ethyl acrylate is present in the range of about 5 to about 30 percent by weight based on the weight of the terpolymer and is preferably in the range of about 15 to about 17 percent by weight. The balance in the copolymer or terpolymer is ethylene.

Silanes suitable for copolymerization with ethylene or ethylene/ethyl acrylate are unsaturated and contain hydrolyzable groups. Examples are vinyltrimethoxy silane, vinyltriethoxy silane, vinyltris-(n-propoxy) silane, vinylbis-(methoxy)methyl silane, vinylbis-(ethoxy)methyl silane, vinylbis-(n propoxy)methyl silane, vinylmethoxydimethyl silane, vinylethoxydimethyl silane, allyltrimethoxy silane, beta-acryloxyethyltrimethoxy silane, beta-methacryloxyethyltrimethoxy silane, gamma-acryloxypropyltrimethoxy silane, gamma-methacryloxypropyltrimethoxy silane, gamma-methacryloxypropyl(methyldiethoxy) silane, beta-methacryloxyethyltriethoxy silane, gamma-methacryloxypropyltriethoxy silane, gamma-methacryloxypropyl-tris- (2-methoxyethoxy) silane, beta-methacryloxypropyl-tris-(n-butoxy) silane, gamma-methacryloxypropyl-tris-(n-dodecyloxy) silane, gamma-methacryloxypropyl-tris-(iso-butoxy) silane, and gamma-methacryloxypropyl-tris-(isopropoxy) silane.

Based on 100 parts by weight of copolymer or terpolymer, the azodicarbonamide is present in the composition in the range of about 1 to about 25 parts by weight; the p,p'-oxybis-benzene sulfonyl hydrazide in the range of about 0.5 to about 3.5 parts by weight; the silanol condensation catalyst in the range of about 0.02 to about 0.3 part by weight; where the organic peroxide is included, the amount used is in the range of about 0.5 to about 2 parts by weight and the monomeric acrylate ester, when used, is present in the range of about 0.5 to about 2 parts by weight.

Preferred ranges for the components based on 100 parts of copolymer or terpolymer are about as follows:

| Component | Parts by Weight |
| --- | --- |
| azodicarbonamide | same as above |
| hydrazide | 1 to 3 |
| silanol condensation catalyst | 0.05 to 0.2 |
| peroxide (optional) | 0.5 to 1.5 |
| acrylate (optional) | 0.5 to 1.5 |

In order to make foams with densities in the range of about 2 to 3 pounds per cubic foot, about 15 to about 25 parts of azodicarbonamide is suggested. Higher density foams can be made by using less azodicarbonamide, e.g., 5 parts or less.

Suitable silanol condensation catalysts are metal carboxylates such as dibutyltin dilaurate, stannous acetate, stannous octoate, lead napthenate, zinc octoate, and iron-2-ethyl hexoate and organo titanates such as tetramethyl titanate, tetraethyl titanate, and tetraisopropyl titanate.

Monomeric acrylate esters of polyhydric compounds include triethylene lycol dimethacrylate, ethylene glycol dimethacrylate, tetraethylene glycol dimethacrylate, polyethylene lycol dimethacrylate, 1,3-butylene glycol diacrylate, 1,4-butylene glycol diacrylate, diethylene glycol diacrylate, diethylene glycol dimethacrylate, 1,6-hexane diol diacrylate, polyethylene glycol diacrylate, tetraethylene glycol diacrylate, pentaerythritol tetraacrylate, 1,-3-butylene glycol dimethacrylate, trimethylolpropane trimethacrylate, and trimethylolpropane triacrylate. A particularly desirable monomeric acrylat is trimethylolpropane triacrylate.

Illustrative of suitable organic peroxides are the polymer hydroperoxides, such as polyethylene hydroperoxide and other such polymer hydroperoxides as are disclosed in U.S. Pat. No. 2,911,398; the perester peroxides such as t-butyl peracetate, t-butyl peroxyisobutyrate, di-t-butyl diperphthalate, t-butyl perbenzoate, di-t-butyl dipermethyl malonate, di-t-amyl dipermethyl malonate, di-t-hexyl diperethyl succinate, di-t-hexyl diperglutarate, and di-t-amyl dipersuccinate as disclosed in U.S. Pat. Nos. 2,763,635 and 2,698,863; diacyl aromatic peroxides, examples of which are the peroxides having the formula: $(R'CO)_2O_2$ wherein $R'$ is an aryl radical, such as benzoyl peroxide, 2,4-dichlorobenzoyl peroxide, and p-chlorobenzoyl peroxide; diacryl aliphatic peroxides such as those having the formula: $R_2CO)_2O_2$ wherein $R_2$ is an alkyl group, for example, acetyl peroxide, caprylyl peroxide, myristoyl peroxide, and lauroyl peroxide; dibasic acid peroxides, such as succinic acid peroxide; the ketone peroxides such as methyl ethyl ketone peroxide and cyclohexanone peroxide; the aldehyde peroxides such as hydroheptyl peroxide; peroxides such as 1,1-dimethyl-1-(isopropyl cyclohexyl)methyl hydroperoxide and 1,1-dimethyl-1-(diisopropyl cyclohexyl)-methyl hydroperoxide disclosed in U.S. Pat. No. 2,776,954; di(aralkyl) peroxides such as dibenzyl peroxide, bis-(α-methylbenzyl)peroxide, bis-(α,α-dimethylbenzylperoxide (di-α-cumylperoxide), bis-(α-methyl-p-methylbenzyl)peroxide and benzyl-(α-methyl-p-isopropylbenzyl)peroxide disclosed in U.S. Pat. No. 2,826,570 hydroperoxides such as 2,5-dimethylhexane-2, 5-dihydroperoxide, p-menthane hydroperoxide, t-butylhydroperoxide, and benzoin peroxide; di-tertiary alkyl peroxides such as di-t-butyl peroxide and 2,5-bis-(tert-butylperoxy)-2, 5-dimethylhexane.

Various additives can be included in the basic composition in conventional amounts, e.g., fillers, silane coupling agents, surfactants, reinforcing additives, antioxidants, processing aids retardants, utlraviolet stabilizers such as zinc oxide, lubricants, dyes, colorants, and smoke inhibitors.

Examples of fillers are carbon black, clay, talc, talc coated with a metal salt of a fatty acid and having 8 to 20 carbon atoms, calcium carbonate, calcium silicate, silica, alumina trihydrate, magnesium hydroxide, magnesium carbonate, and zinc borate.

The silane coupling agents are exemplified by gamma-methacryloxypropyltrimethoxy silane; methyltriethoxy silane; methyltris (2methoxyethoxy) silane; dimethyldiethoxy silane; vinyltris(2methoxyethoxy) silane; vinyltrimethoxy silane; and vinyltriethoxy silane; and mixtures of the foregoing.

Surfactants that are useful in the present invention include polysiloxanes containing, on a per molecule basis, at least one silicon bonded alkyl group of at least 12 carbon atoms, as generally represented by the average formula:

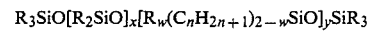

wherein R is a monovalent hydrocarbon radical of 1 to 12 carbon atoms, preferably methyl, n is an integer of at least 12 and preferably not more than 24, w is an integer of 0 or 1, preferably 1, x is an integer of at least 1, preferably 10 or more, and y is an integer of 1 or more, preferably at least 10. R, w and n can be the same or different.

Additional surfactants are the polyoxyalkylene compounds having one or more polyoxyalkylene blocks, each bonded at one end to a siloxane block, an alkyl group having at least 12 carbon atoms, or an alkenyl group, and bonded at the other end to an alkoxy group, a siloxane block, or a hydroxy group. These surfactants include the "hydrolyzable" polysiloxane polyoxyalkylene block copolymers such as the block copolymers described in U.S. Pat. Nos. 2,834,748 and 2,917,480 and the "non hydrolyzable" polysiloxane-polyoxyalkylene block copolymers such as the block copolymers described in U.S. Pat. Nos. 3,505,377 and 3,686,254, and British Pat. No. 1,220,471. These polysiloxane polyoxyalkylene block copolymers preferably contain from 5 to 50 weight percent of polysiloxane polymer with the remainder being polyoxyalkylene polymer.

Useful surfactants also include polyoxyalkylene polyols of a wide range of molecular weights such as polyoxyethylene glycol, polyoxypropylene glycol, or polyoxyethylenepolyoxypropylene glycol in which the ethyleneoxy groups and propyleneoxy groups are randomly distributed in the molecular chain or in which blocks of two or more ethyleneoxy groups are connected to blocks of propyleneoxy groups. Liquid surfactants are preferred over solid surfactants.

The polysiloxane-polyoxyalkylene block copolymer surfactants are preferred. The polyoxyalkylene chains or blocks can comprise all of the alkyleneoxy units or all propyleneoxy units or units of both randomly dispersed throughout the block or assembled into sub blocks of ethyleneoxy units and sub blocks of propyleneoxy units. Preferred polysiloxane polyoxyalkylene block copolymers are those having the higher molecular weight polysiloxane blocks.

Useful reinforcing additives include polymerizable unsaturated organic compounds having at least two polymerizable unsaturated groups. Suitable unsaturated organic compounds include ester diol 2,4-diacrylate, 1,4 butylene glycol diacrylate, diethylene glycol dimethacrylate, triallyl-s-triazine-2,4,6-(1H, 3H, 5H) trione, triallyl mellitate, pentaerythritol triacrylate, polycaprolactone triacrylate, m-phenylene bis maleimide, dipentaerythritol pentaacrylate, melamine triacrylate, epoxidized linseed oil/acrylate, triacryloyl hexahydro-s-triazine, trimethylolpropane trimaleate, trimethacryloyl hexahydro-s-triazine, N,N-tetraacryloyl 1,6-diaminopyridine, 1,3-butylene glycol dimethacrylate, 1,3-butylene glycol diacrylate, ethylene glycol dimethacrylate, ethylene glycol diacrylate, diethylene glycol diacrylate, triethylene glycol diacrylate, polyethylene glycol dimethacrylate, polyethylene glycol diacrylate, trimethylol propane trimethacrylate, trimethylol propane triacrylate, divinyl sulfone, dicyclopentadiene, bisalkyl glycol dicarbonate, triallyl cyanurate, acetyl triallyl citrate, divinyl benzene, dialkyl pthalate, tetraallylmethylenediamine, tetraallyl oxyethane, 3-methyl-1,4,6-heptatriene; 1-10-decamethylene glycol dimethacrylate and di-, tri-, tetra-, and penta-acrylates of poly(vinyl alcohol). In addition, the following low molecular weight polyunsaturated polymers may be used: polybutadiene oligomers, hydroxyl terminated polybutadiene oligomers, hydroxyl terminated styrene-butadiene and acrylonitrilebutadiene oligomers, unsaturated polyesters, and partial alkylic esters of styrene-maleic anhydride oligomers.

It is preferred to employ polymerizable unsaturated organic compounds that have a high unsaturated level to molecular weight ratio. Therefore, the tri-, tetra-, and penta-acrylates of poly(vinyl alcohol) and the other tri-, tetra-, and penta-acrylates and methacrylates of polyols such as pentaerythritol, methylolpropane and dipentaerythritol as described hereinabove are preferred.

The antioxidant is a compound conventionally used for that purpose. Examples of antioxidants are: hindered phenols such as tetrakis [methylene(3,5-di-tert-butyl-4-hydroxyhydrocinnamate)]methane and thiodiethylene bis(3,5-di-tert-butyl-4-hydroxy)hydrocinnamate; phosphites and phosphonites such as tris(2,4-di-tert-butylphenyl)phosphite and di-tert-butylphenylphosphonite; and various amines such as polymerized 2,2,4-trimethyl-1,2-dihydroquinoline.

A processing aid is useful to achieve a homogeneous blend. Examples are metal stearates such as stearates of zinc, aluminum, calcium, and magnesium and metallic salts of other fatty acids such as oleates and palmitates. Polysiloxanes can be used instead of the fatty acid metal salts if desired, for example, polydimethylhydrosiloxane and polymethylsiloxane.

Examples of flame retardants are tricresyl phosphate, triphenyl phosphate, decabromodiphenyl oxide, ethylene(bis-tetrabromphthalimide), chlorinated polyethylene, polyvinyl chloride, and halogenated paraffin waxes, alone or in admixture with inorganic compounds such as antimony oxide and/or alkaline earth metal oxides, carbonates, hydroxides, and sulfates. Suitable alkaline earth metal oxides are calcium oxide, calcium carbonate, calcium hydroxide, calcium sulfate, magnesium oxide, magnesium carbonate, magnesium hydroxide, and magnesium sulfate.

The patents and applications mentioned in the specification are incorporated by reference herein.

The invention is illustrated by the following examples. Parts and percentages are by weight.

EXAMPLE 1

The following composition is used in the example:

| Component | Parts by Weight |
|---|---|
| 1. hydrolyzable ethylene/silane copolymer (0.5 to 2 percent by weight silane) | 100.0 |
| 2. p,p'-oxybis-benzene sulfonyl hydrazide | 2.7 |
| 3. a masterbatch made up of 40% by weight azodicarbonamide and 60% by weight low density polyethylene or ethylene/silane copolymer (as above) | 49.9 |
| 4. a masterbatch made up of | 6.7 |

-continued

| Component | Parts by Weight |
|---|---|
| ethylene/ethyl acrylate copolymer 37% zinc oxide 50% dioctyl tin maleate 2.5% zinc stearate 10% antioxidant 0.5% | |
| 5. trimethylol propane triacrylate | 1.3 |
| 6. dicumyl peroxide | 1.3 |

The copolymer, hydrazide, triacrylate, and peroxide are mixed in a Brabender or Banbury mixer or on a 2 roll mill, and pelletized. The two masterbatches are then mixed together in the same manner and pelletized. The pellets of the two mixtures are then mixed together and placed in an extruder where the components are formed into a sheet, about ⅛ to 3/16 inch thick. Up until this point the temperature is maintained below 125° C. to prevent decomposition of the blowing agents and the peroxide. The mixing temperature is 100° C. and the extruder temperature is 120° C. The sheet is immediately placed in an oven at 200° C. The result is a smooth sided, fine cell foam having a density of 2.5 pounds per cubic foot.

The hydrazide is considered to act as a nucleating agent assisting in the formation of fine (or small) cells and as a source of water for an in situ cure. Note that no water is added to effect the cure. It is believed that the peroxide causes free radical crosslinking and that the water from the hydrazide also causes crosslinking. The crosslinking increases the viscosity of the sheet, the increased viscosity being necessary to obtain the foam.

EXAMPLES 2 to 5

Example 1 is repeated except that the following components are used in the following proportions:

| | Parts by Weight | | | |
|---|---|---|---|---|
| Examples | 2 | 3 | 4 | 5 |
| Components | | | | |
| 1. Ethylene/ethyl acrylate/ silane terpolymer (ethyl acrylate 15 to 17% and silane 0.5 to 2%) (melt index 2 to 3) | 100 | 100 | 100 | 100 |
| 2. A masterbatch containing 40% azodicarbonamide and 60% low density polyethylene, ethylene/silane copolymer, or ethylene/ ethyl acrylate/silane terpolymer. Note: In example 4, azodicarbonamide powder is used instead of the masterbatch. | 50 | 50 | 50 | 15.4 |
| 3. A masterbatch containing: ethylene/ethyl acrylate copolymer 37% zinc ethyl acrylate oxide 50% dioctyl tin maleate 2.5% zinc stenate 10% antioxidant 0.5% | 6.7 | 6.7 | 6.7 | 5.1 |
| 4. p,p'-oxybis-benzene sulfonyl hydrazide | 2.7 | 2.7 | 2.7 | 2.1 |
| 5. dicumyl peroxide | — | 1.3 | 1.3 | 0.5 |
| 6. trimethylol propane triacrylate | — | — | 1 | — |

The result is a smooth sided, fine cell foam having the following densities:

| Examples | Foam Density (lbs/cu. ft.) |
|---|---|
| 2 | 2.15 |
| 3 | 2.17 |
| 4 | 3.3 |
| 5 | 2.45 |

In example 2, crosslinking takes place without the peroxide. It is believed that the water from the hydrazide causes the crosslinking.

I claim:

1. A foamable composition comprising a polymer selected from the group consisting of a hydrolyzable ethylene/silane copolymer and a hydrolyzable ethylene/ethyl acrylate/silane terpolymer and the following components in about the following amounts per 100 parts by weight of polymer:

| Component | Parts by Weight |
|---|---|
| azodicarbonamide | 1 to 25 |
| p,p'oxybis-benzene sulfonyl hydrazide | 0.5 to 3.5 |
| silanol condensation catalyst | 0.02 to 0.3 |
| an organic peroxide | 0.5 to 2 |
| a monomeric polyunsaturated acrylate ester of a polyhydric compound | 0.5 to 2 |

2. The composition defined in claim 1 wherein the following components are present in about the following amounts per 100 parts by weight of polymer:

| Component | Parts by Weight |
|---|---|
| p,p'-oxybis-benzene sulfonyl hydrazide | 1 to 3 |
| silanol condensation catalyst | 0.05 to 0.2 |

3. The composition defined in claim 2 wherein the organic peroxide is present in an amount of about 0.5 to about 1.5 parts by weight per 100 parts by weight of polymer.

4. The composition defined in claim 2 wherein the monomeric acrylate ester of a polyhydric compound is present in an amount of about 0.5 to about 1.5 parts by weight per 100 parts by weight of polymer.

5. The composition defined in claim 4 wherein the polymer is an ethylene/silane copolymer.

6. The composition defined in claim 4 wherein the polymer is an ethylene/ethyl acrylate/silane terpolymer.

* * * * *